United States Patent [19]

Michel et al.

[11] Patent Number: 5,656,900

[45] Date of Patent: Aug. 12, 1997

[54] RETRO-REFLECTIVE INFRARED SAFETY SENSOR FOR GARAGE DOOR OPERATORS

[75] Inventors: Andrew J. Michel, Winfield, Ill.; Colin B. Willmott, Landsweiler, Germany

[73] Assignee: The Chamberlain Group, Inc., Elmhurst, Ill.

[21] Appl. No.: 461,370

[22] Filed: Jun. 5, 1995

[51] Int. Cl.$^6$ ............................ E05F 15/20
[52] U.S. Cl. .................. 318/286; 318/468; 318/480; 49/25; 49/26
[58] Field of Search ........................ 318/264, 265, 318/266, 286, 466, 467, 468, 469, 480; 49/25, 26, 28

[56] References Cited

U.S. PATENT DOCUMENTS 4,922,168   5/1990   Waggamon et al. .................. 318/286
5,191,268   3/1993   Duhame .............................. 318/266
5,357,183   10/1994  Lin .................................. 318/468

*Primary Examiner*—Bentsu Ro
*Attorney, Agent, or Firm*—Fitch, Even, Tabin & Flannery

[57] ABSTRACT

A garage door operator has an electric motor controlled by a control unit. A transmission is connected to the motor to be driven thereby to open and close a garage door. An infrared obstacle detector is connected to the control unit and includes a unitary infrared pulse emitter and an infrared detector. A missing pulse detector is coupled to the infrared detector to generate a door opening signal if the door is closing when the pulses are absent due to the infrared being interrupted by an obstacle or not having been generated. The control unit receives the door opening signal and causes the electric motor to open the garage door.

6 Claims, 3 Drawing Sheets

RETRO-REFLECTIVE INFRARED SAFETY SENSOR FOR GARAGE DOOR OPERATORS

BACKGROUND OF THE INVENTION

The invention relates in general to a garage door operator and, in particular, to a garage door operator having an optical or infrared obstacle sensing system adapted to generate an infrared or optical light beam across a door opening to detect the presence of obstacles to signal other portions of a garage door operator when obstacles are present to prevent a garage door from being closed on the obstacle or to cause the door to reverse and open away from the obstacle.

One of the problems associated with typical garage door operators is that when a garage door operator is commanded to close, the door operator may close onto an obstacle in the way of the door causing damage to the operator. The door operator also may close on an object which may be damaged such as a automobile, child's tricycle or even upon a person. As a result, a number of schemes have been adopted to prevent the power operated garage doors from closing on obstacles.

A number of garage door operators include edge-type sensors usually comprising a flexible strip attached to a bottom edge of the garage door, which flexible strip deforms when it comes in contact with an obstacle. Deformation of the flexible strip may increase pressure of a trapped fluid within the strip or close switches signaling the garage door operator that an obstacle has been encountered. The garage door operator then switches into its up mode and immediately raises the garage door. Such systems, however, are relatively expensive to install as the strip must be attached to the bottom of the garage door, it must be aligned and the material cost is relatively high.

Other systems, such as the Chamberlain Protector optical detection system employ an optical detector having an infrared radiation unit positioned on one side of a garage door opening and an infrared receiving unit positioned on the other side of the garage door opening. Such units are somewhat more expensive as they require separate emitter and radiator heads and require good alignment between the emitter and the radiator. However, they are attractive from the standpoint of the manufacture of the garage door operator because attenuation of the infrared beam due to the emitter becoming soiled or due to other environmental changes has less effect upon the output of the detector than would occur in a retro-reflector system which requires the beam to travel twice as far, thus attenuating the beam by four times as much under the inverse square law.

What is needed, then is a retro-reflective infrared or optical detection system which can sense when a failure has occurred in the detection system and signal other portions of a garage door operator to open.

SUMMARY OF THE INVENTION

A garage door operator for use in controlling a garage door or other movable barrier embodies the present invention. The garage door operator includes a drive unit which may be mounted from the ceiling of the garage having an electric motor therein. A control unit is coupled to the electric motor to command the electric motor to move in one direction or another to provide mechanical energy through a transmission connected to the electric motor which is coupled to the garage door in order to open and close the garage door. An optical or infrared detection unit is connected to the control unit and includes a synchronizing signal generator for generating an optical synchronizing signal. An infrared emitter is also included in the infrared unit for providing a pulsed infrared beam which carries across a space from one edge of a garage door opening to the opposite edge. The reflector reflects the pulsed infrared beam back to the detector. The detector is coupled to an integrated circuit for generating a pulsed beam detection output signal which is fed to a missing pulse detector. The missing pulse detector normally provides an output signal in a non-alarm condition, but when a pulse is absent for a preselected period of time, the missing pulse detector generates an alarm signal which is then provided to the control unit of the garage door operator. The control unit of the garage door operator then commands the electric motor to open the garage door and the garage door is raised to its uppermost position by the electric motor.

DETAILED DESCRIPTION OF THE PREFERRED EMBODIMENT

Figure 1:
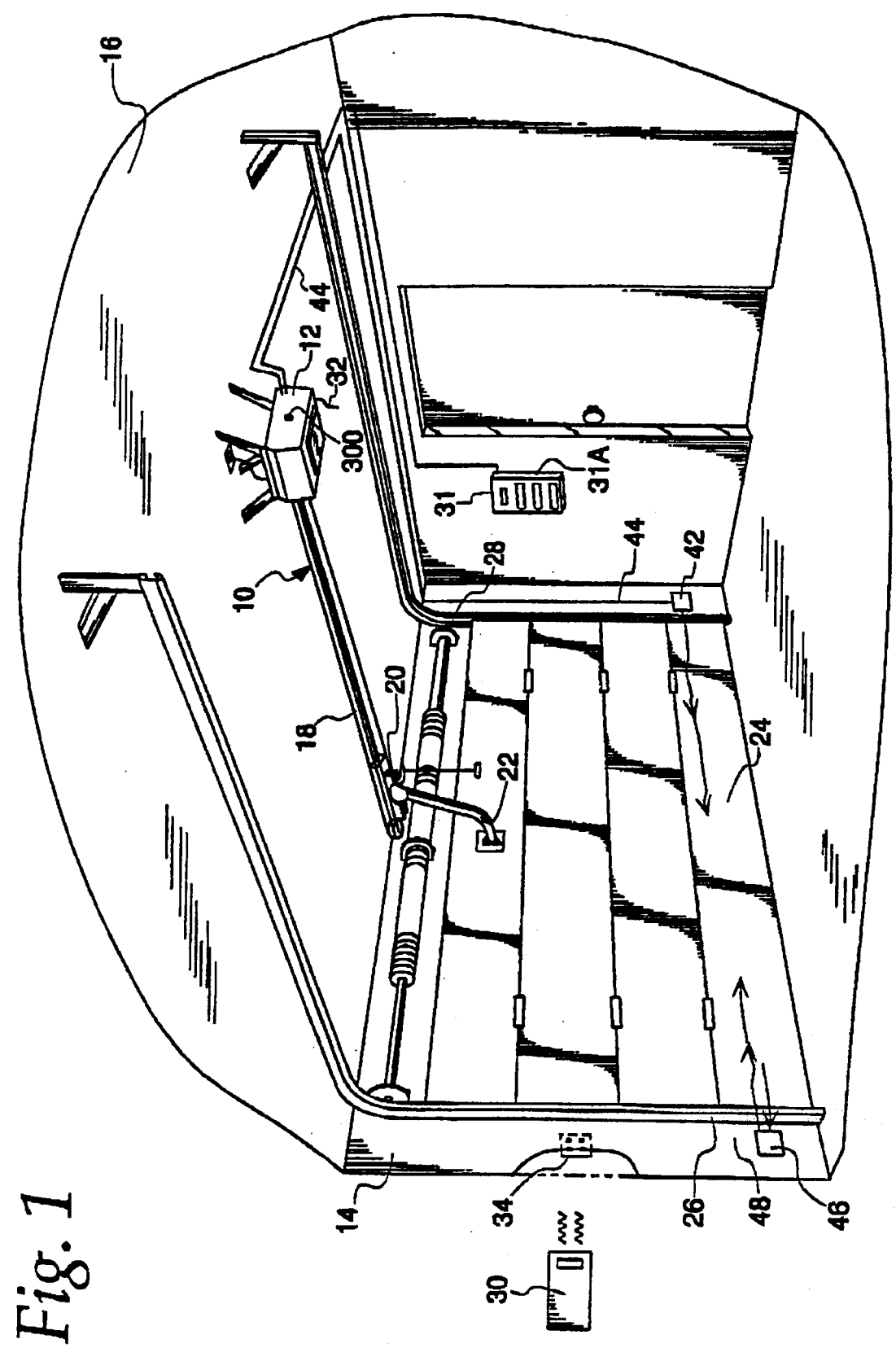
FIG. 1 is a perspective view of a garage door operator mounted within a garage and coupled to a garage door to open and close it.

Referring now to the drawings and especially to FIG. 1, a garage door operator embodying the present invention is generally shown therein and identified by numeral 10. The garage door operator includes a head unit 12 mounted within a garage 14 on a ceiling 16. A transmission including a T-rail or screw drive 18 extends from the control head 12 and has a disconnectable trolley 20 connected thereto. An arm 22 is connected to the trolley and is connected to a multi-panel garage door 24 for opening and closing the garage door. The garage door is carried on a pair of L-shaped channels 26 and 28 as is conventional for multi-panel garage doors. A radio transmitter 30 may communicate by radio frequency energy with an antenna 32 extending from the head unit 12 to cause the head unit 12 to open and close the garage door. Likewise, an inside control panel 31 may communicate over a wire 31a with the head unit 12. A permanently mounted keypad radio transmitter 34 may also communicate with antenna 32 of the head unit to command the head unit to open and close the door. A combination photo-emitter and detector 42 is connected by leads 44 to the head unit to receive electrical energy therefrom. An infrared reflector 46 is positioned at the opposite door edge to receive and reflect back infrared energy to the emitter and detector 42.

Figure 2:
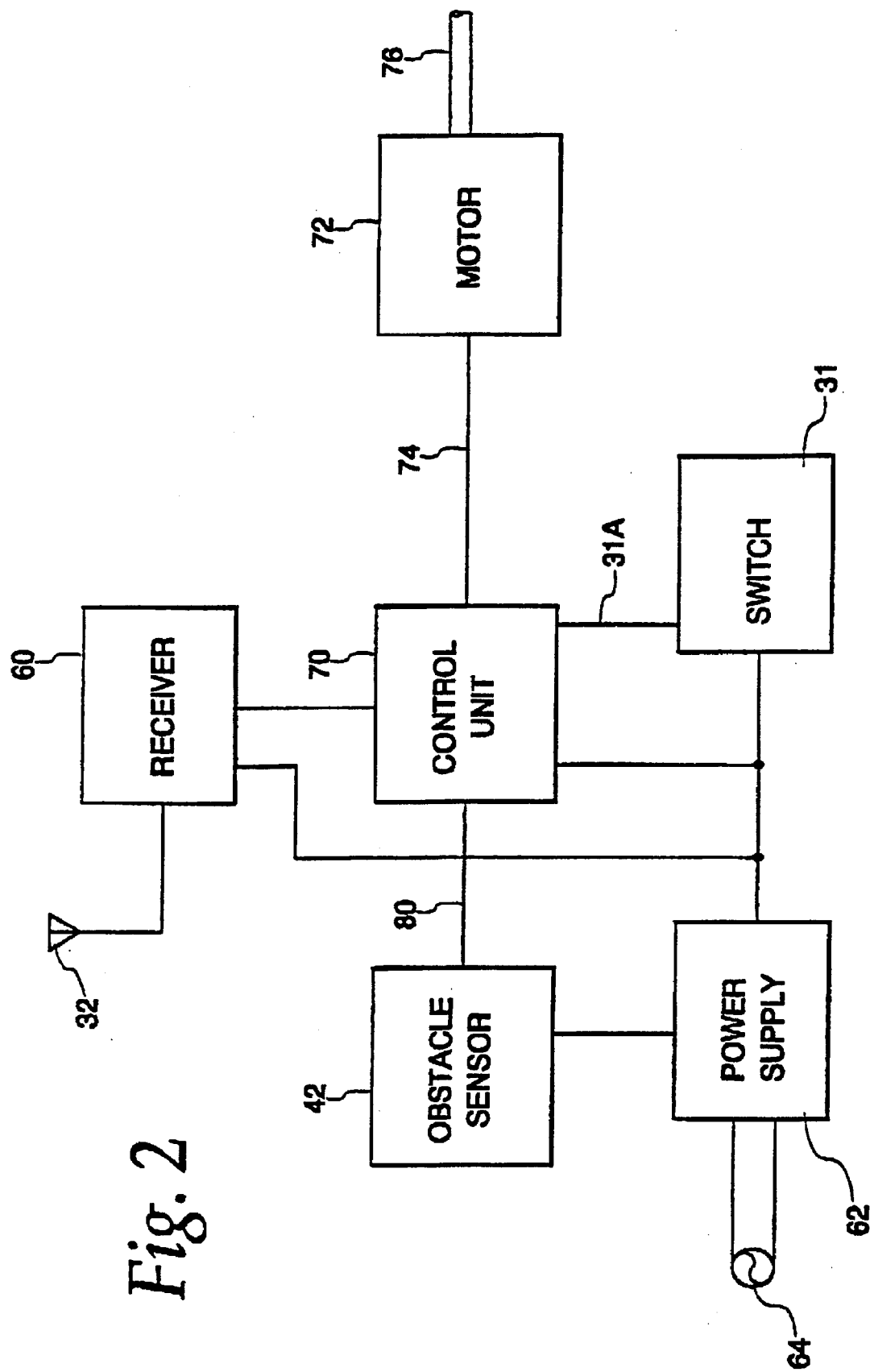
FIG. 2 is a block diagram of portions of the garage door operator shown in FIG. 1.

Referring now to FIG. 2, a block diagram is shown therein including components of a head unit 12. A receiver 60 is coupled to the antenna 32 to receive radio signals therefrom which may be received from either of the transmitting units and the receiver 60 is energized by a power supply 62 coupled to receive energy from an alternating current power source 64, such as household current or the like. The obstacle sensor 42 is also energized by the power supply as is the control panel 31 and a control unit 70 as well as the motor 72 which is energized through the control unit 70. When the receiver 60 or the control panel 31 provide commands to the control unit 70, it signals over a line 74 to the electric motor 72 to provide rotation on an output shaft 76 coupled to the T-rail to move the trolley back and forth to open and close the door.

Figure 3:
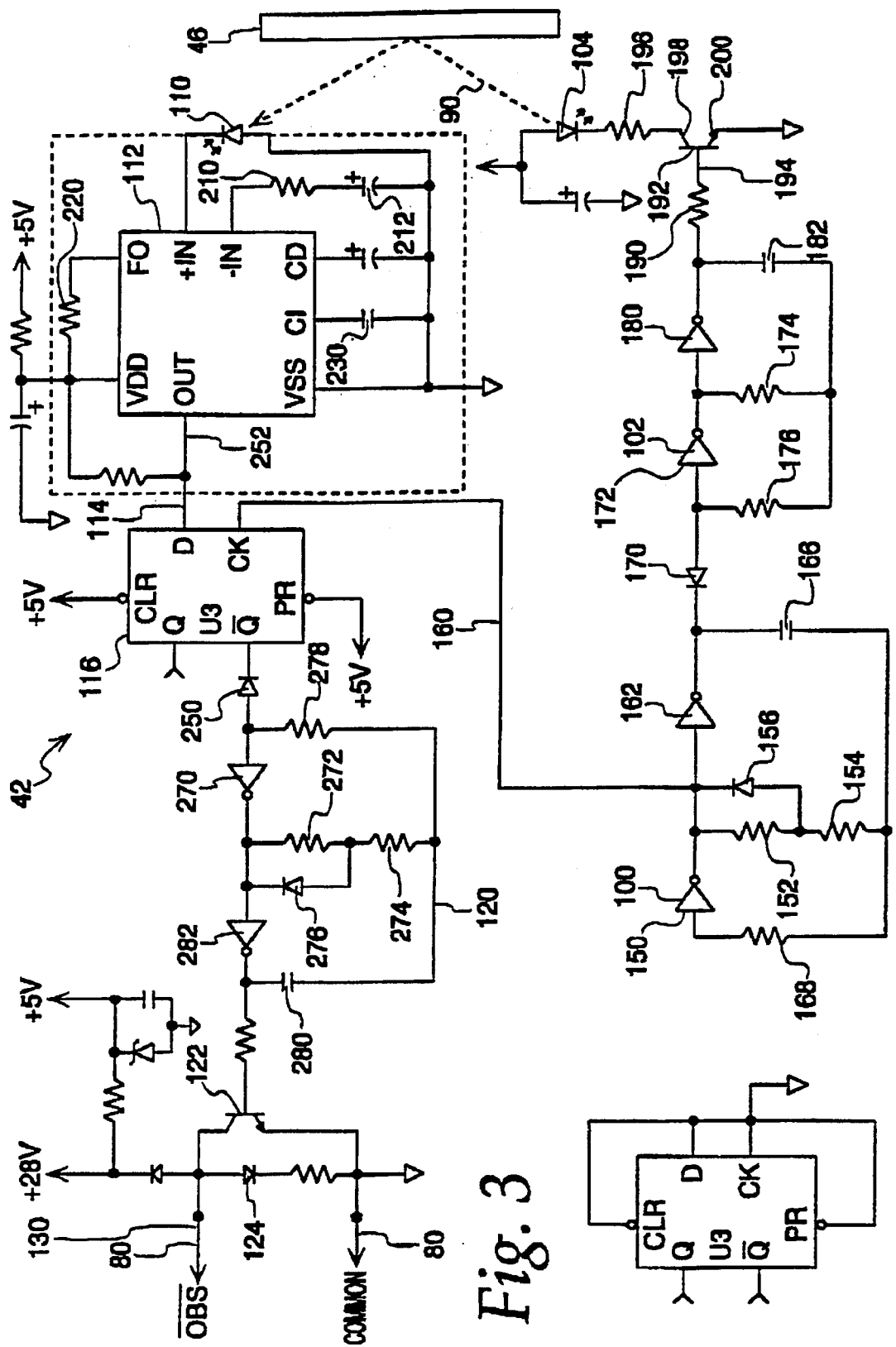
FIG. 3 is a schematic diagram of a retro-reflective infrared sensing system employed in the garage door operator shown in FIGS. 1 and 2.

Referring now to FIG. 3, details of the optical sensor 42 are shown therein. The optical sensor 42 supplies an output signal over a line 80 to the control unit. The optical sensor 42 includes a first oscillator 100 and a second oscillator 102 coupled to the first oscillator 100. An infrared emitter 104 provides a pulsed signal to the infrared reflector 46 which is then received by an infrared detector 110 which generates an electrical signal to an infrared signal processor 112 which is a receiver pre-amplifier for an infrared remote control system, specifically an IR3T26 from Sharp Electronics Company. The signal processor 112 feeds a signal over a lead 114 to a D flip-flop 116 which receives a synchronizing signal at its clock pin and the infrared emitter signal at its D pin. Its $\overline{Q}$ pin is connected to an oscillator 120 which provides a signal to a transistor 122 which, when switched off, causes a light emitting diode 124 to be illuminated indicating normal operation. When the transistor is switched on, the diode 124 is shorted, switching the diode off and generating a low signal at a lead 130 which is supplied to the control unit to signal the control unit either that the emitter has failed causing pulses to be missing, that the external reflector has failed causing pulses to be missing or that something has interrupted the optical path 90 causing pulses to be missing and commanding the electric motor 72 to open the door.

The oscillator 100 is a 13% duty cycle oscillator which generates a low output for 13 milliseconds and a high output for 1 millisecond. The oscillator comprises an inverter 150 coupled at its output terminal to a voltage divider comprising resistors 152 and 154. A diode 156 is connected to the junction of resistors 152 and 154 and supplies an output signal on a line 160 connected to the clock pin of the flip-flop 116. A second inverter 162 is connected to the diode 156 and has a capacitor 166 connected between its output and the resistor 154. A feedback resistor 168 connects the junction of the capacitor 166 and the resistor 154 to the inverter 150. Relatively low duty cycle helps to keep power consumption to a minimum. In the event that the output has gone high for 1 millisecond, a steering diode 170, which is reverse biased, allows the second oscillator 102 to run. The second oscillator 102 includes an inverter 172 having a resistor 174 connected to its output and a feedback resistor 176 connected between the resistor 174 and its input. A second inverter 180 has connected to its output a capacitor 182 which is connected to the junction of resistors 174 and 176. Oscillator 102 generates a 38 kHz signal which is fed through a resistor 190 to an NPN transistor 192 at its base 194. The transistor 192 is connected via a resistor 196 at its collector 198 to the infrared emitting diode 104 which is connected to the 28 volt power supply from power supply 62. The emitter 200 of the transistor 192 is grounded. The 38 kHz signal then biases the base of the transistor 192 causing a 38 kHz pulsed signal to be generated by the infrared emitter causing a 38 kHz beam 90 to be sent to the external reflector 46 and, in the absence of obstacles, reflected back to the infrared detector 110. The integrated circuit 112 is a shielded integrated digital preamplifier having a resistor 210 and an electrolytic capacitor 212 connected in series to its –IN pin. The resistor 210 sets the gain of a first stage within the preamplifier to about 86 db. The combination of resistor 210 and capacitor 212 comprises a low pass filter. Within the integrated circuit preamplifier is a limiter and a 38 kHz bandpass filter for which a resistor 220 coupled to the VDD input and the FO input sets the center frequency. The stages help to prevent direct current coupled sunlight interference from reaching later detector stages. A capacitor 230 is connected to the CI input and acts as an integrator to a comparator stage. A digital output is then fed to the D input of the D flip-flop 116. Clock input from the lead 160 generated by the oscillator 100 causes the flip-flop to act as a synchronization detector to prevent noise signals from being passed to later stages and, thus, acts as a discriminator over noise pulses. A diode 250 which is reverse biased is connected to the $\overline{Q}$ output of the D flip-flop and acts as a steering diode to switch the output oscillator 120 on for about 50 milliseconds and off for about 200 milliseconds when the clock signal on line 160 is positive and there is no output from an output terminal 252 of the integrated circuit 112. The output oscillator consists of an inverter 270 having a pair of resistors 272 and 274 connected in a voltage divider network with a diode 276 connected in parallel with a resistor 272. A feedback resistor 278 is connected between resistor 274 and the input to the inverter. A capacitor 280 is connected between an output of a second inverter 282 and the resistor 274. In the event that an obstruction is encountered, the transistor 122 is biased conducting and non-conducting blinking the LED 124 causing a pulsed output on the line 130. When the door is traveling down this commands the control unit to cause the electric motor to open the garage door. Among the advantages provided by this detector is that no user adjustment is needed for the control, plus a long-range operation can be provided. Due to the fail safe nature of the missing pulse detector, in the event that the optical path 90 fails rather than being blocked, the garage door operator will then open, if then in a closing mode. The system also uses a single pair of power line runs from the opener head to the combination infrared emitter and detector causing less radio frequency energy to be radiated by the 38 kHz signal supplied to the infrared emitter diode and providing lower cost of wiring and reduced installation time.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

We claim:

1. A garage door operator comprising:

an electric motor;

a transmission connectable to the electric motor for connection to a garage door to open and close the garage door;

a control unit connected to the electric motor to command the electric motor to open and close the garage door;

a synchronizing signal generator for generating a synchronizing signal;

an infrared emitter enabled by the synchronizing signal for directing toward a reflector a pulsed infrared beam;

an infrared detector positioned in proximity with the infrared emitter for generating a pulsed beam detection output signal in response to the reflected infrared pulses; and a missing pulse detector enabled by the synchronizing signal and coupled to receive the pulsed beam detection output signal from the infrared detector, for supplying a missing pulse signal to said control unit when the pulsed beam detection output signal is absent.

2. A garage door operator according to claim 1, wherein said missing pulse detector comprises a flip-flop for receiving the synchronizing signal and the pulsed beam detection output signal, which is clocked by the synchronizing signal and which flips states when the pulsed beam detection output signal is absent when said flip-flop is clocked.

3. A garage door operator according to claim 2, wherein:

said infrared emitter comprises an oscillator for modulating the pulsed infrared beam; and said infrared detector comprises a demodulator for demodulating the modulated pulsed infrared beam.

4. An obstacle detection circuit for use with a garage door operator, comprising:

a first oscillator for generating a primary pulsed signal having a first frequency;

a second oscillator for receiving the primary pulsed signal and producing a modulated pulsed signal using a second frequency;

an infrared emitter for directing toward a reflector a modulated pulsed infrared signal in response to receiving the modulated pulsed signal;

an infrared detector positioned in proximity with the infrared emitter for generating a detection signal of said first frequency in response to the modulated pulsed infrared signal from the reflector; and a missing pulse detector responsive to the primary pulsed signal from said first oscillator and the detection signal from said infrared detector for providing a missing pulse signal when the primary pulsed signal is present and the detection signal is absent.

5. An obstacle detection circuit according to claim 4, wherein said infrared detector comprises a bandpass filter for passing only components from the modulated pulsed infrared signal having frequencies approximately equal to said second frequency.

6. An obstacle detection circuit according to claim 4, further comprising:

a third oscillator enabled by said missing pulse signal for generating a third frequency signal;

an obstruction indication lead for connection to a garage door power supply;

a common lead for connection to the garage door power supply; and a shorting transistor for shorting said obstruction indication lead and said common lead in response to the third frequency signal from said third oscillator.

* * * * *